United States Patent
Noguchi et al.

(10) Patent No.: US 10,852,493 B2
(45) Date of Patent: Dec. 1, 2020

(54) OPTICAL SUBASSEMBLY AND OPTICAL MODULE

(71) Applicant: Lumentum Japan, Inc., Sagamihara, Kanagawa (JP)

(72) Inventors: Daisuke Noguchi, Kanagawa (JP); Hiroshi Yamamoto, Tokyo (JP)

(73) Assignee: Lumentum Japan, Inc., Kanagawa (JP)

( * ) Notice: Subject to any disclaimer, the term of this patent is extended or adjusted under 35 U.S.C. 154(b) by 0 days.

(21) Appl. No.: 16/456,751

(22) Filed: Jun. 28, 2019

(65) Prior Publication Data
US 2020/0041735 A1 Feb. 6, 2020

(30) Foreign Application Priority Data

Aug. 3, 2018 (JP) .................................. 2018-147077
Aug. 3, 2018 (JP) .................................. 2018-147078

(51) Int. Cl.
*G02B 6/42* (2006.01)

(52) U.S. Cl.
CPC ......... *G02B 6/4244* (2013.01); *G02B 6/4256* (2013.01); *G02B 6/4278* (2013.01); *G02B 6/4206* (2013.01)

(58) Field of Classification Search
None
See application file for complete search history.

(56) References Cited

U.S. PATENT DOCUMENTS

| 7,366,215 | B2 * | 4/2008 | Aruga ................ H01S 5/02276 372/38.05 |
| 2009/0135864 | A1 * | 5/2009 | Aruga ................ H05K 1/0243 372/29.02 |
| 2009/0263082 | A1 * | 10/2009 | Sasada ................ G02B 6/4292 385/33 |
| 2017/0064831 | A1 | 3/2017 | Noguchi et al. |
| 2017/0202081 | A1 * | 7/2017 | Ikeda ................ H01S 5/02256 |

FOREIGN PATENT DOCUMENTS

| JP | 2004335584 A | 11/2004 |
| JP | 2009162942 A | 7/2009 |
| JP | 2011134740 A | 7/2011 |
| JP | 2017050357 A | 3/2017 |

* cited by examiner

*Primary Examiner* — Jerry Rahll
(74) *Attorney, Agent, or Firm* — Harrity & Harrity, LLP

(57) ABSTRACT

An optical subassembly may include a device mounting substrate on which an optical device is mounted, a relay substrate including a first conductor pattern transmitting a electrical signal to the optical device, a pedestal including a third surface on which the relay substrate is placed and a fourth surface on which the device mounting substrate is placed and a spacer interposed between the third surface and the relay substrate to electrically connect the relay substrate and the pedestal. In an optical subassembly, the first lead terminal may include a small-diameter part and a large-diameter part provided at an end of the small-diameter part and having a larger diameter than that of the small-diameter part, and at least part of the large-diameter part may be exposed from the dielectric on a first surface side and the first lead terminal and the first conductor pattern may be connected by brazing and soldering.

20 Claims, 13 Drawing Sheets

FIG.5A

| No. | PIN HEIGHT[mm] | LARGE-DIAMETER PART DIAMETER[mm] |
|---|---|---|
| S1 | 0 | 0.25 |
| S2 | 0.05 | 0.25 |
| S3 | 0.1 | 0.25 |
| S4 | 0.15 | 0.25 |
| S5 | 0.2 | 0.25 |
| S6 | 0 | 0.35 |
| S7 | 0.05 | 0.35 |
| S8 | 0.1 | 0.35 |
| S9 | 0.15 | 0.35 |
| S10 | 0.2 | 0.35 |
| S11 | 0 | 0.45 |
| S12 | 0.05 | 0.45 |
| S13 | 0.1 | 0.45 |
| S14 | 0.15 | 0.45 |
| S15 | 0.2 | 0.45 |
| S16 | 0 | 0.55 |
| S17 | 0.05 | 0.55 |
| S18 | 0.1 | 0.55 |
| S19 | 0.15 | 0.55 |
| S20 | 0.2 | 0.55 |
| S21 | 0 | 0.65 |
| S22 | 0.05 | 0.65 |
| S23 | 0.1 | 0.65 |
| S24 | 0.15 | 0.65 |
| S25 | 0.2 | 0.65 |

OPTICAL SUBASSEMBLY AND OPTICAL MODULE

CROSS-REFERENCE TO RELATED APPLICATION

The present application claims priority from Japanese applications 2018-147077 filed on Aug. 3, 2018, and 2018-147078 filed on Aug. 3, 2018, the content of which is hereby incorporated by reference into this application.

BACKGROUND OF THE INVENTION

1. Field of the Invention

The present invention relates to an optical subassembly and an optical module.

2. Description of the Related Art

At present, Internet and most of telephone networks are constructed by optical communication networks. An optical module used as an interface of a router/switch and a transmission device as optical communication devices has an important role of converting an electrical signal into an optical signal. The optical module is generally configured to have an optical subassembly housing an optical device, a printed circuit board (hereinafter referred to as a PCB) on which IC and the like for processing signals including a modulated electrical signal are mounted and a flexible printed circuit board (hereinafter referred to as a FPC) electrically connecting between them.

In recent years, there are intense requests for speeding up as well as reducing in price in the optical module, and a demand for an optical module capable of transmitting and receiving a high-speed optical signal at low cost is increasing. As the optical module satisfying the above-described request, for example, it is known that a TO-CAN package type optical subassembly having a shape in which a lead terminal inserted into the FPC or the like protrudes from a metal stem contained in a can-shaped package and the like is used. The metal stem is configured by including an approximately disc-shaped eyelet and a pedestal provided so as so protrude from the eyelet.

In JP 2017-50357 A (Patent Literature 1) and JP 2011-134740 A (Patent Literature 2), a technique of transmitting a 25 Gbit/s-class modulated electrical signal to the optical device is disclosed.

It is difficult to match a characteristic impedance to a desired value in the TO-CAN type optical subassembly having the lead terminal as an electrical interface. In the above Patent Literatures 1 and 2, an dielectric substrate is inserted just under the lead terminal for preventing an increase in inductance at a lead terminal part to thereby reinforce electrical coupling with respect to the pedestal as a ground conductor by a high dielectric constant of the dielectric substrate and to alleviate the inductance by capacitance, which prevent an undesirable increase in impedance.

Furthermore, connection between the lead terminal and the dielectric substrate is not performed by wire connection but by brazing and soldering to thereby suppress generation of an unnecessary inductance component. Moreover, the configuration in which connection between the lead terminals and the dielectric substrate is easy is adopted.

However, in the above related-art configuration, it is difficult to realize both securement of a space for mounting the optical device and matching of the characteristic impedance. That is, in a case where a diameter of a through hole is increased for matching the characteristic impedance of a coaxial line formed by the through hole into which the lead terminal is inserted, the dielectric and the lead terminal, a distance between the pedestal formed so as to avoid the through hole and the lead terminal is increased. Accordingly, it is necessary to increase a thickness of the dielectric substrate for connecting the dielectric substrate and the lead terminal. On the other hand, it is necessary to increase a line width of a conductor pattern provided on the dielectric substrate in the case where the thickness of the dielectric substrate is increased for matching the characteristic impedance in the dielectric substrate. When the line width of the conductor pattern is increased, a space for mounting the optical device is reduced. Therefore, it is difficult to realize both the securement of the space for mounting the optical device and matching of the characteristic impedance.

The request for speeding up is increasing in recent years, and a demand for an optical module, for example, having a transmission rate of 40 Gbit/s class or more is increasing. It is necessary to perform impedance matching more strictly for realizing design corresponding to the further request for speeding up, however, there is a problem that it is difficult to realize the above.

It is necessary to set the diameter of the through hole provided in the eyelet to a desired value determined from the dielectric constant of the dielectric filled in the through hole and a diameter of the lead terminal for performing impedance matching more strictly, as a result, there is a case where a large gap is generated between the pedestal and the lead terminal. The return current propagating in the ground conductor detours around the through hole and propagates to the dielectric substrate through the pedestal, but the inductance component corresponding to the distance between the pedestal and the dielectric substrate is parasitic, which makes strict impedance matching more difficult.

SUMMARY OF THE INVENTION

The present disclosure has been made in view of the above problems and a first object thereof is to realize both securement of a space for mounting an optical device and matching of characteristic impedance.

A second object of the present disclosure is to perform impedance matching more strictly in an optical module in which a lead terminal and a dielectric substrate are connected by brazing and soldering.

In order to solve the above problems, an optical subassembly according to one aspect of the present disclosure includes an eyelet having a first surface and a second surface arranged opposite the first surface, a first through hole penetrating from the first surface to the second surface, a first lead terminal inserted into the first through hole and transmitting an electrical signal, a dielectric filled in the first through hole, a device mounting substrate on which an optical device converting at least one of an optical signal and the electrical signal into another is mounted, a relay substrate including a first conductor pattern transmitting the electrical signal to the optical device, a pedestal protruding from the first surface to an extending direction of the first through hole and including a third surface on which the relay substrate is placed and a fourth surface on which the device mounting substrate is placed, and a spacer interposed between the third surface and the relay substrate to electrically connect a back surface of the relay substrate and the pedestal.

An optical subassembly according to another aspect of the present disclosure includes an eyelet having a first surface and a second surface arranged opposite the first surface, a first through hole penetrating from the first surface to the second surface, a first lead terminal inserted into the first through hole and transmitting an electrical signal, a dielectric filled in the first through hole, a device mounting substrate on which an optical device converting at least one of an optical signal and the electrical signal into another, a relay substrate including a first conductor pattern transmitting the electrical signal to the optical device, a pedestal protruding from the first surface to an extending direction of the first through hole, on which the relay substrate and the device mounting substrate are placed, in which the first lead terminal has a small-diameter part and a large-diameter part provided at an end of the small-diameter part and having a larger diameter than that of the small-diameter part, and at least part of the large-diameter part is exposed from the dielectric on the first surface side and the first lead terminal and the first conductor pattern are connected by brazing and soldering.

An optical module according to the present disclosure includes the optical subassembly, a printed circuit board and a flexible printed circuit board electrically connected to the printed circuit board and the optical subassembly.

According to the optical subassembly according to one aspect of the present disclosure and the optical module including the same, both securement of the space for mounting the optical device and matching of the characteristic impedance can be realized.

Moreover, according to the optical subassembly according to another aspect of the present disclosure and the optical module including the same, further impedance matching can be realized.

BRIEF DESCRIPTION OF THE DRAWINGS

FIG. 5A is a table of data used for a high-frequency three dimensional electromagnetic field simulator HFSS (High Frequency Structure Simulator) according to the first embodiment;

DETAILED DESCRIPTION

A first embodiment of the present disclosure will be explained below with reference to the drawings.

Figure 1:
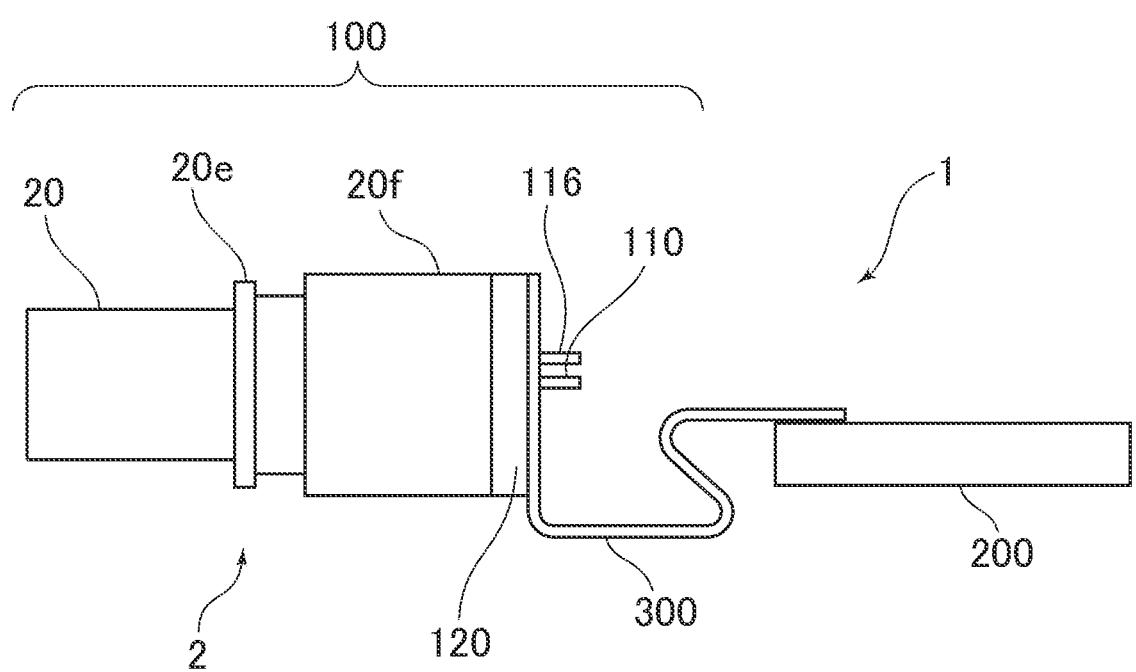
FIG. 1 is an outline drawing of an optical module according to a first embodiment.

FIG. 1 is an outline drawing of an optical module 1 to be applied to optical communication according to the embodiment. A modulated electrical signal is transmitted from a drive IC (not shown) mounted on a PCB 200 to an optical subassembly 100 through a FPC 300 connected to the PCB 200 by solder or the like. The optical subassembly 100 houses an optical device and has an interface transmitting and receiving an emitted light or an incident light. The optical subassembly 100 includes an eyelet 120 and an optical receptacle 2. A specific structure of the optical receptacle 2 will be explained later with reference to FIG. 3. The optical subassembly 100, the PCB 200 and the FPC 300 are housed inside a not-shown casing made of metal or the like to configure the optical module 1.

Here, as examples of the optical subassembly 100, there are an optical transmission module (TOSA; Transmitter Optical Subassembly) including a light emitting device such as a laser diode thereinside and converting an electrical signal into an optical signal to be transmitted, an optical receiving module (ROSA; Receiver Optical Subassembly) including a light receiving device typified by a photodiode thereinside and converting a received optical signal into an electrical signal, a bidirectional module (BOSA; Bidirectional Optical Subassembly) including the both functions and so on. The invention of the present application can be applied to any of the above optical assemblies and the optical transmission module will be explained as an example in the present embodiment.

Figure 2:
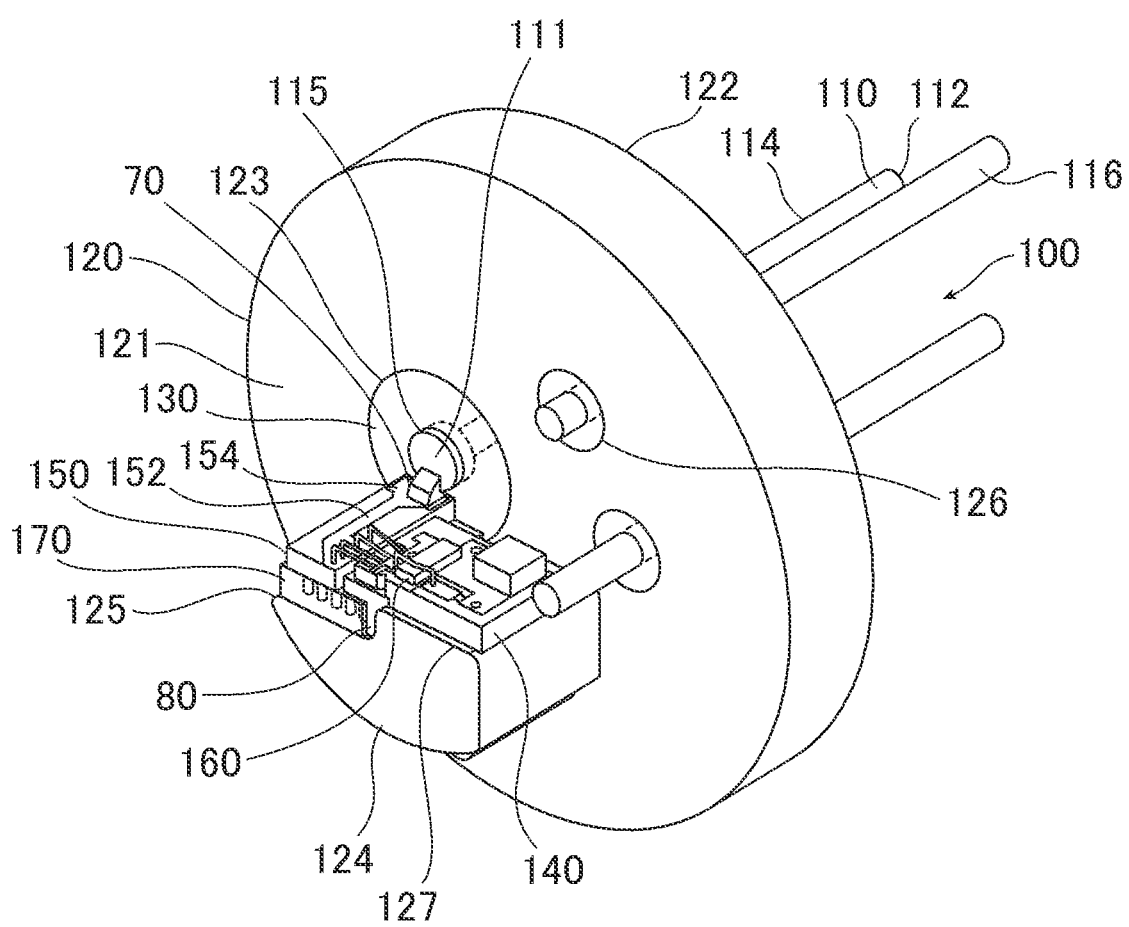
FIG. 2 is a schematic view showing an internal structure of an optical subassembly according to the first embodiment.

FIG. 2 is a schematic perspective view showing an internal structure of the optical subassembly 100 according to the first embodiment of the present disclosure. The optical subassembly 100 includes, for example, the conductive eyelet 120 made of metal and having a disc shape with a diameter of 5.6 mm. The eyelet 120 has a first surface 121 and a second surface 122 arranged opposite the first surface 121. The eyelet 120 also has a first through hole 123 and a second through hole 126 penetrating from the first surface 121 to the second surface 122.

The optical assembly 100 also includes a pedestal 124 protruding from the first surface 121 of the eyelet 120 to an extending direction of the first through hole 123. The pedestal 124 includes a third surface 125 on which a relay substrate 150 is placed and a fourth surface 127 on which a device mounting substrate 140 is placed. On the device mounting substrate 140, an optical device 160 converting at least one of the optical signal and the electrical signal into the other is mounted. The relay substrate 150 includes a first conductor pattern 152 transmitting the electrical signal to the optical device 160. The eyelet 120 and the pedestal 124 configure a stem.

In the present embodiment, the device mounting substrate 140 is made of ceramic such as aluminum nitride having a thermal expansion coefficient close to that of the optical device 160, and the optical device 160 is die-bonded onto the device mounting substrate 140. The device mounting substrate 140 has metallized patterns on front and back surfaces thereof, and the back surface of the device mounting substrate 140 is connected to the pedestal 124 of the stem as a ground conductor. On a front surface (mounting surface) side of the device mounting substrate 140 on which the optical device 160 is mounted, a second conductor pattern 141 (see FIG. 8) to be a transmission line is formed.

A first lead terminal 110 transmitting the electrical signal is inserted into the first through hole 123 of the eyelet 120, and a dielectric 130 is filled between the first through hole 123 and the first lead terminal 110. The eyelet 120, the dielectric 130 and the first lead terminal 110 form a coaxial line. Hereinafter, the coaxial line is referred to as a "glass coaxial part".

In the present embodiment, the third surface 125 is arranged at a position farther from the center of the eyelet 120 (a lower direction in FIG. 2) than the fourth surface 127 in a direction orthogonal to the third surface 125 (a vertical direction in FIG. 2). As described later, when a characteristic impedance of the glass coaxial part is matched to 50Ω, it is necessary to increase a diameter of the first through hole 123 as compared with a case where, for example, the impedance is matched to 25Ω. Here, it is desirable that the first through hole 123 does not overlap with the pedestal 124 when seen from an extending direction of the first lead terminal 110 on a manufacturing process. That is, in a case where the pedestal 124 and the eyelet 120 are integrally formed, the structure in which the first through hole 123 does not overlap with the pedestal 124 when seen from the extending direction of the first lead terminal 110 is desirable as the first through hole 123 can be easily formed. When the structure where the first through hole 123 does not overlap with the pedestal 124 is adopted, it is necessary to shift a region of the pedestal 124 on which the relay substrate 150 is placed from a central position as it is required to provide the pedestal 124 so as to avoid the first through hold 123 having a large diameter. On the other hand, it is necessary to arrange the optical device 160 at the central position of the eyelet 120. Accordingly, the structure in which the fourth surface 127 on which the device mounting substrate 140 where the optical device 160 is mounted is placed is arranged at a position close to the center of the eyelet 120 (an upper direction in FIG. 2) than the third surface 125 on which the relay substrate 150 is placed, thereby increasing the diameter of the first through hole 123 without reducing efficiency on the manufacturing process while keeping the position of the optical device 160 at the central position. As a result, the characteristic impedance of the glass coaxial part can be matched to 50Ω.

It is also necessary to increase the diameter of the first through hole 123 as described later for matching the characteristic impedance of the glass coaxial part to 50Ω, therefore, a distance between the pedestal 124 formed so as to avoid the first through hole 123 and the first lead terminal 110 is increased. On the other hand, the relay substrate 150 is required to form a microstrip line in which the characteristic impedance becomes 50Ω, therefore, it is necessary to increase a line width of the first conductive pattern 152 formed on the relay substrate 150 when a thickness of the relay substrate 150 is increased. In a case where aluminum nitride is used as a material forming the relay substrate 150, a relative dielectric constant thereof is 8.7. For example, when the thickness of the relay substrate 150 is 0.5 mm, it is necessary to set the line width of the first conductive pattern 152 to a width of 0.5 mm, and the relay substrate 150 itself is required to be increased in size. When the relay substrate 150 is increased in size, the device mounting substrate 140 have to be reduced in size, which reduces a space for mounting the optical device 160.

In response to the above problem, a spacer 170 is interposed between the relay substrate 150 and the pedestal 124 in the present embodiment, and the spacer 170 electrically connects aback surface of the relay substrate 150 to the pedestal 124. That is, the structure in which a ground potential of the pedestal 124 is lifted up to an upper surface of the spacer 170. Accordingly, the thickness of the relay substrate 150 can be reduced to, for example, 0.2 mm. As a result, it is possible to suppress the increase of the line width of the first conductor pattern 152 formed on the relay substrate 150 as the dielectric substrate connected to the first lead terminal 110. The line width of the first conductive pattern 152 formed on the relay substrate 150 can be set to 0.2 mm in the present embodiment. Accordingly, it is possible to suppress size increase of the relay substrate 150 and both securement of the space for mounting the optical device 160 and matching of the characteristic impedance can be realized.

Figure 4:
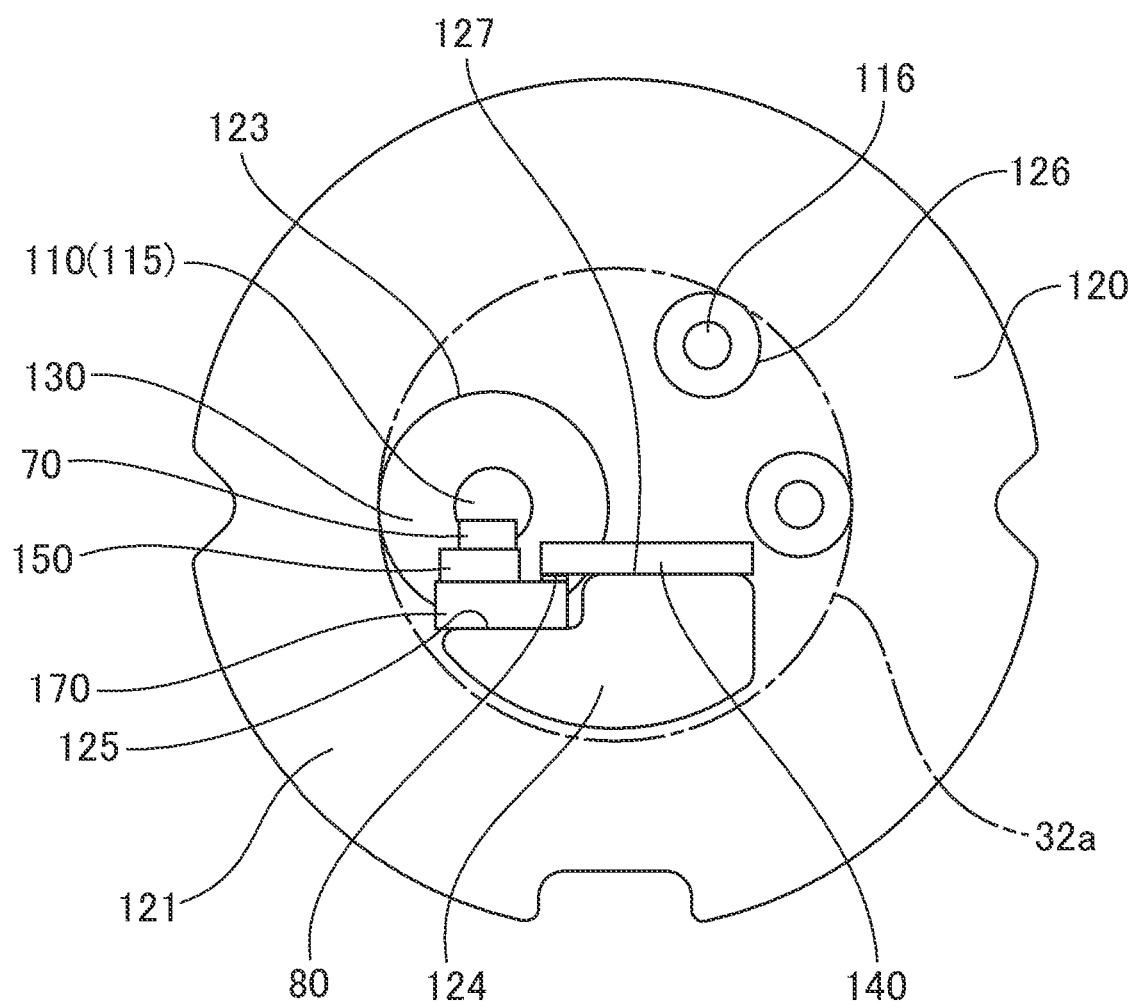
FIG. 4 is a schematic plan view of the optical subassembly according to the first embodiment.

As shown in FIG. 4, the spacer 170 including the ground conductor overlaps with the dielectric 130 when seen from the extending direction of the first lead terminal 110. The spacer 170 may be made of ceramic such as aluminum nitride as well as the front and the back of the spacer 170 are electrically connected by providing a plurality of buried via holes in this ceramic substrate. It is also preferable to form the spacer 170 by a metal plate with a thickness of 0.3 mm. Structures are not limited to the above and it is naturally possible to adopt any structure as far as the upper surface of the spacer 170 has the ground potential.

FIG. 4 is a schematic plan view of the optical subassembly 100 according to the first embodiment shown in FIG. 2.

The present embodiment has the structure in which the third surface 125 is arranged at the position farther from the center of the eyelet 120 (a lower direction in FIG. 4) than the fourth surface 127 in the direction orthogonal to the third surface 125 (a vertical direction in FIG. 4) as shown in FIG. 4. Note that the third surface 125 is approximately parallel to the fourth surface 127 in the present embodiment.

A level difference between the third surface 125 and the fourth surface 127 is formed to be larger than the thickness of the spacer 170 in the direction orthogonal to the third surface 125 (the vertical direction in FIG. 4). According to the structure, the device mounting substrate 140 is not pushed up by the spacer 170 and the device mounting device 140 can be placed without being inclined to the fourth surface 127. Accordingly, a front surface of the spacer 170 is arranged at a position farther from the center of the eyelet 120 (the lower direction in FIG. 4) than the back surface of the device mounting substrate 140 in the direction orthogonal to the third surface 125.

Part of the front surface of the spacer 170 does not overlap with the relay substrate 150 and is exposed when seen from the direction orthogonal to the third surface 125. Moreover, part of the back surface of the device mounting substrate 140 protrudes from a fourth surface 127 side to a third surface 125 side when seen from the direction orthogonal to the fourth surface 127. A structure may be adopted in which part of the device mounting substrate 140 protruding from the fourth surface 127 side to the third surface 125 side is connected to the relay substrate 150 by two or more bonding wires.

The structure in which part of the device mounting substrate 140 protrudes from the fourth surface 127 side to the third surface 125 side when seen from the direction orthogonal to the fourth surface 127 is adopted as described above, thereby securing an area on the surface of the device mounting substrate 140 and allowing the optical device 160 (laser), a modulation device 186, the second conductor pattern 141, a ground pattern 146 and so on which are described later with reference to FIG. 8 to be placed on the device mounting substrate 140. In particular, when the diameter of the first through hole 123 is increased as shown in FIG. 4, it is necessary to provide the third surface 125 in the pedestal 124 so as to avoid the first through hole 123, therefore, an area of the third surface 125 is required to be large. As a result, an area of the fourth surface 127 have to be reduced and it is difficult to place the optical device 160 and so on. However, in the case where the structure in which part of the device mounting substrate 140 protrudes from the fourth surface 127 side to the third surface 125 side when seen from the direction orthogonal to the fourth surface 127 is adopted, the area of the front surface (the mounting surface for the optical device 160) in the device mounting surface 140 can be secured and parts such as the optical device 160 can be placed on the device mounting substrate 140.

On the other hand, in the case where the structure in which part of the device mounting substrate 140 protrudes from the fourth surface 127 side to the third surface 125 side when seen from the direction orthogonal to the fourth surface 127 is adopted, part of the device mounting substrate 140 does not directly contact the pedestal 124 to be the ground potential, therefore, the ground may be unstable and may affect transmission characteristics in a high frequency range.

In response to the above problem, a ground conductor 80 that directly connect part of the back surface of the device mounting substrate 140 and part of the front surface of the spacer 170 is interposed between the part of the back surface of the device mounting substrate 140 and part of the front surface of the spacer 170. The ground conductor 80 is arranged so as to overlap with part of the front surface of the spacer 170 and part of the back surface of the device mounting substrate 140 when seen from the direction orthogonal to the third surface 125.

Figure 9:
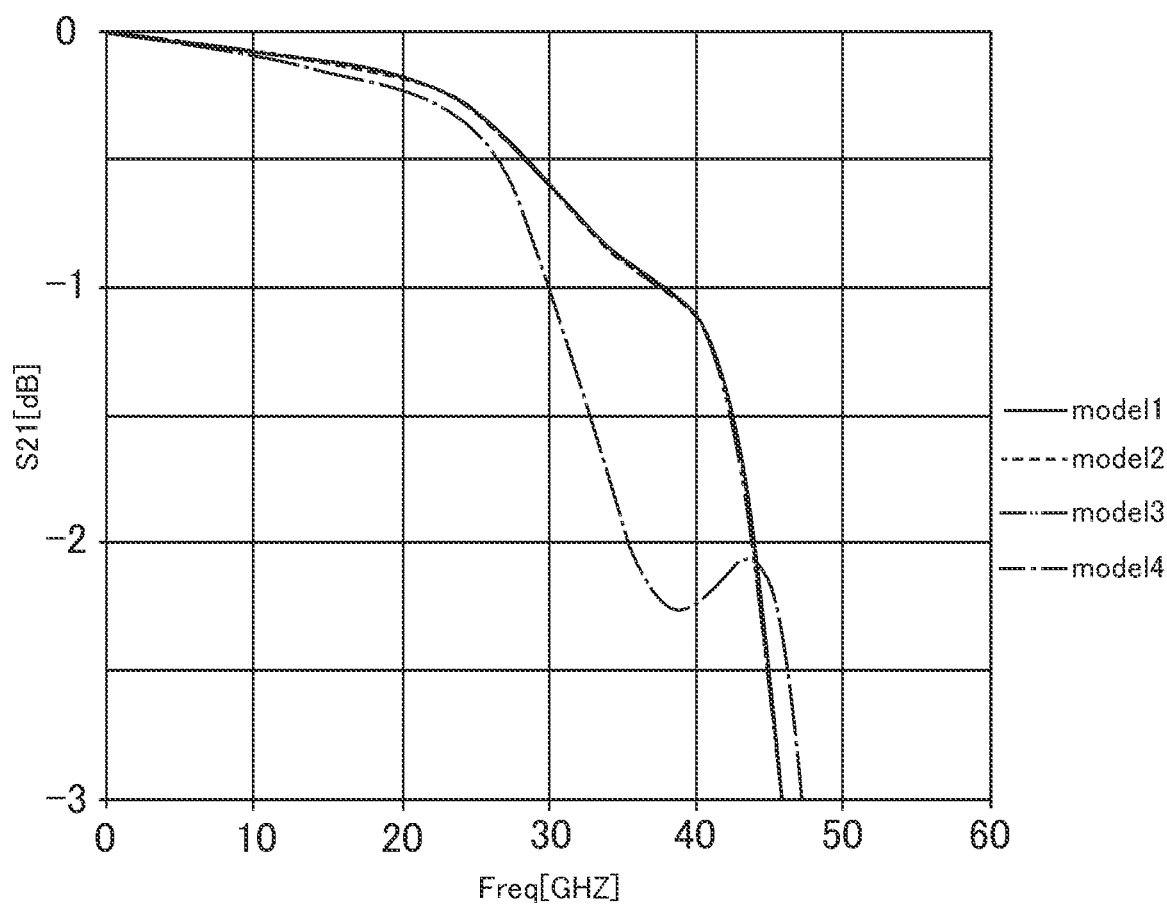
FIG. 9 is a graph obtained by calculating transmission characteristics in respective connection states between a device mounting substrate and a spacer by the high-frequency three dimensional electromagnetic field simulator HFSS (High Frequency Structure Simulator) according to the first embodiment.

FIG. 9 shows results obtained by calculating transmission characteristics in respective connection states between the device mounting substrate 140 and the spacer 170 by a high-frequency three dimensional electromagnetic field simulator HFSS (High Frequency Structure Simulator).

In FIG. 9, the horizontal axis represents the frequency of electrical signals to be transmitted and the vertical axis represents the signal level, namely, transmission characteristics obtained when the electrical signal transmitted from a position where the first lead terminal 110 shown in FIG. 2 crosses the second surface 122 is transmitted to a second wire 184 (see FIG. 8) directly connected to the optical device 160. Accordingly, it is desirable that a S21 [dB] as a value of the vertical axis is a high value.

Figure 10:
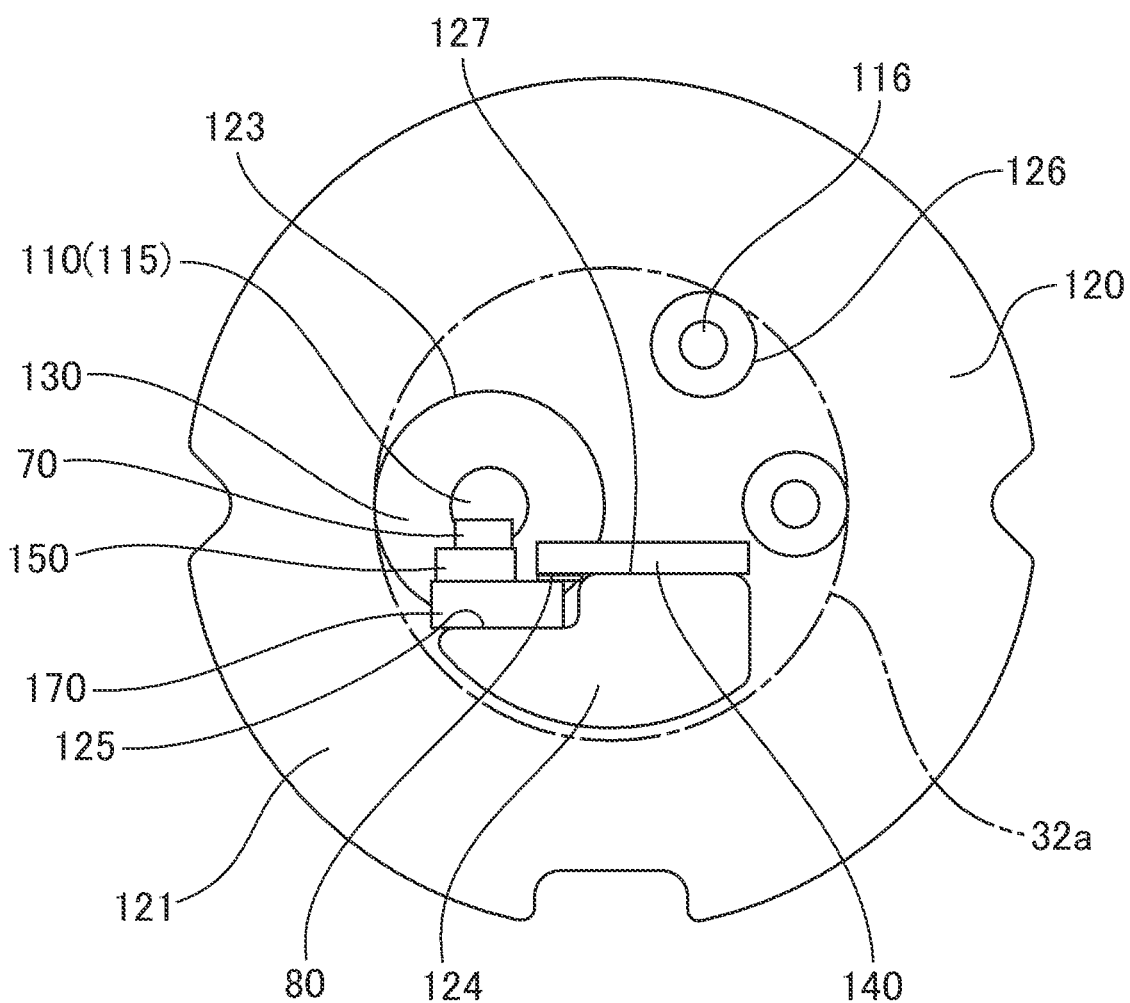
FIG. 10 is a schematic plan view of an optical subassembly according to another example of the first embodiment.
Figure 11:
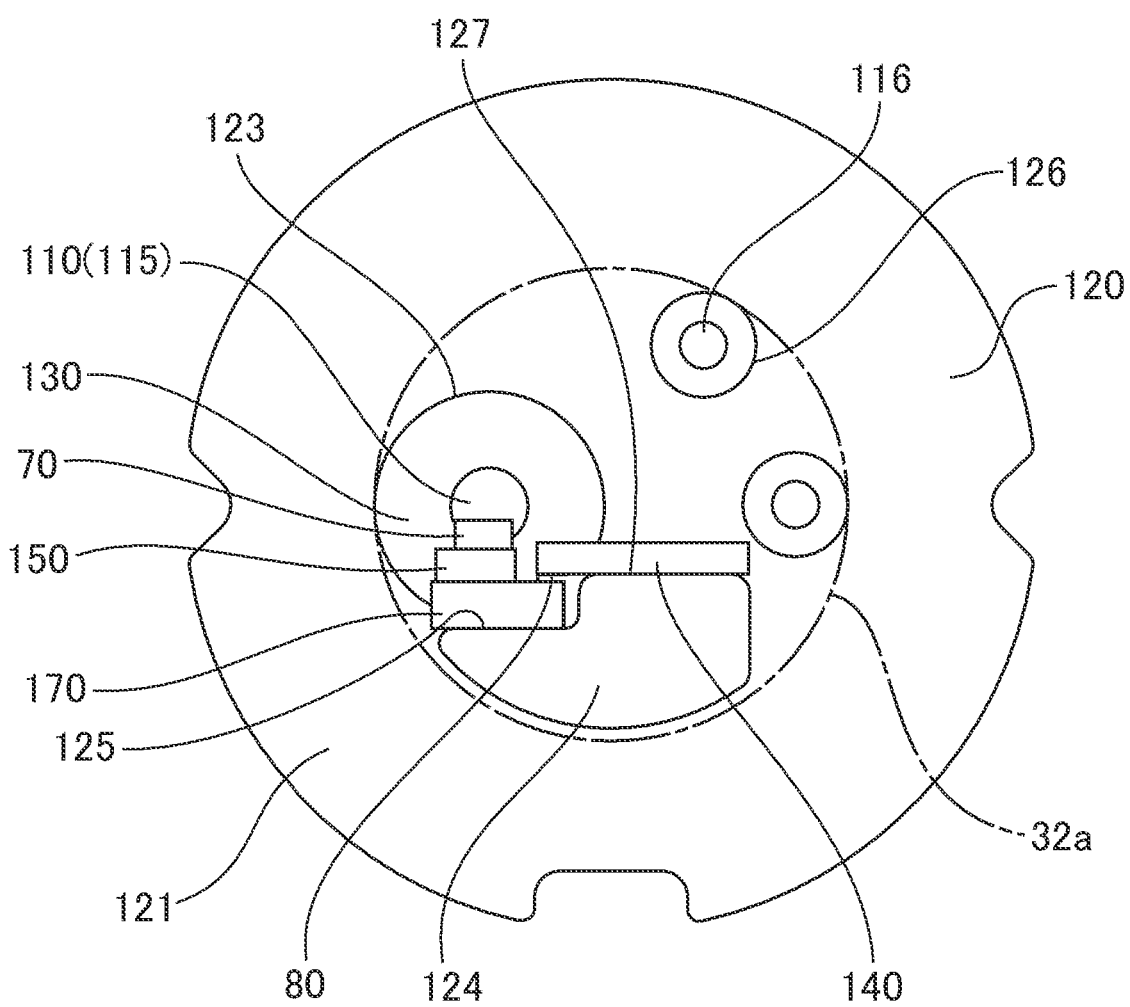
FIG. 11 is a schematic plan view of an optical subassembly according to another example of the first embodiment.
Figure 12:
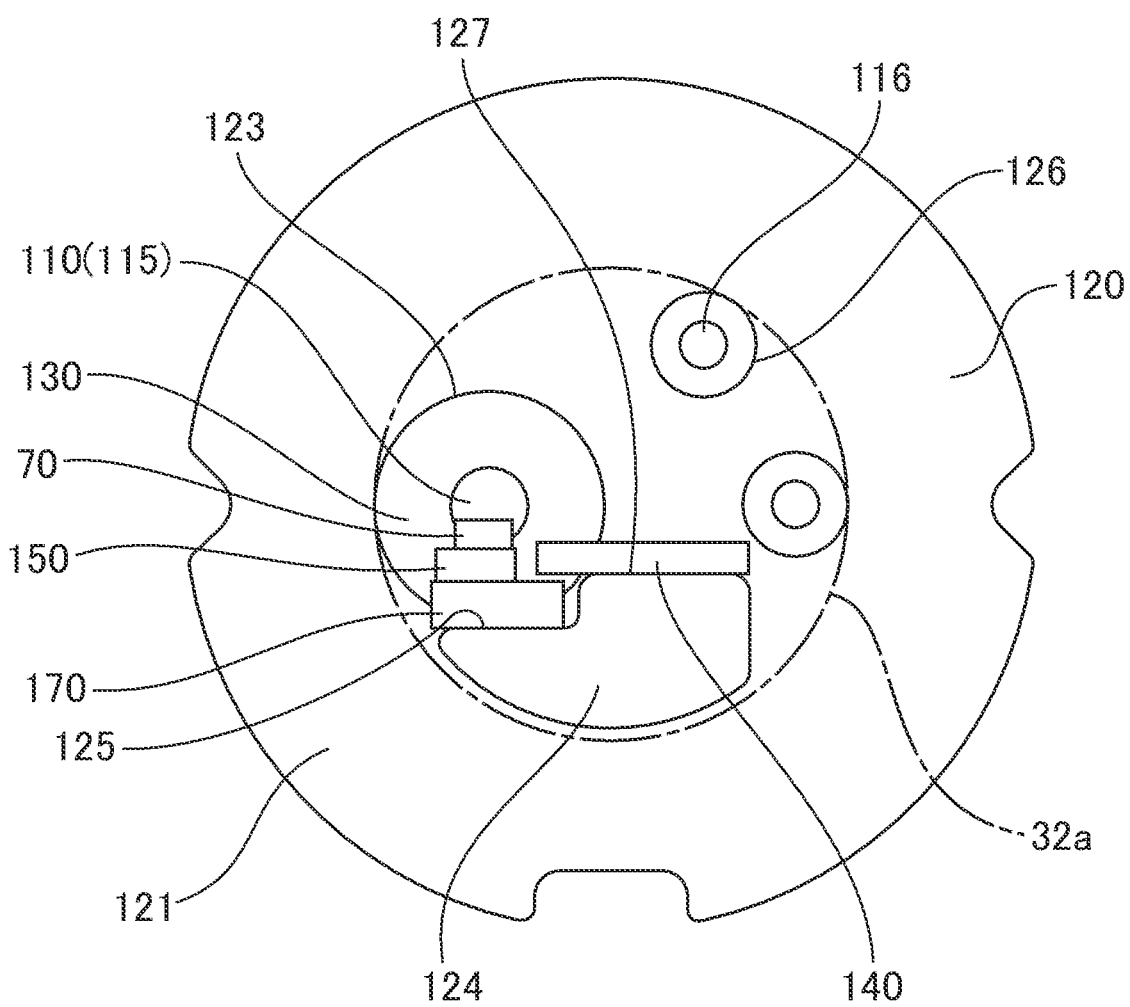
FIG. 12 is a schematic plan view of an optical subassembly according to a comparative example.

In FIG. 9, "model 1" indicates characteristics of a structure in which solder is interposed as the ground conductor 80 between part of the back surface of the device mounting substrate 140 and part of the front surface of the spacer 170 which face each other as shown in FIG. 4. As shown in FIG. 10, "model 2" indicates characteristics of a structure in which a formation region of the ground conductor 80 is extended from the facing part between the back surface of the device mounting substrate 140 and the spacer 170 to the outer side of the facing part so that the ground conductor 80 reaches a portion where the back surface of the device mounting substrate 140 faces the third surface 125 of the pedestal 124. As shown in FIG. 11, "model 3" indicates characteristics of a structure in which the formation region of the ground conductor 80 is extended from the facing part between the back surface of the device mounting substrate 140 and the front surface of the spacer 170 to the outer side of the facing part so that the ground conductor 80 fills a portion where the back surface of the device mounting substrate 140 faces the third surface 125 of the pedestal 124. As shown in FIG. 12, "model 4" indicates characteristics of a structure in which the ground conductor 80 is not provided at the facing part between the back surface of the device mounting substrate 140 and the front surface of the spacer 170. In all models, the back surface of the device mounting substrate 140 is metallized and the surface contacting the fourth surface 127 has the ground potential. That is, the region of the back surface of the device mounting substrate 140 protruding to the third surface 125 side has also the ground potential. Although solder is used as an example of the ground conductor 80 in this case, the structure example of the ground conductor 80 is not limited to the above, and a conductive adhesive or the like may be used.

According to the results shown in FIG. 9, it is found that transmission characteristics of "model 1", "model 2" and "model 3" maintain high values of approximately 1 dB particularly in a range of 30 GHz to 40 GHz as compared with transmission characteristics of "model 4".

As described above, the structure in which the ground conductor 80 directly connecting part of the back surface of the device mounting substrate 140 and part of the front surface of the spacer 170 is interposed between part of the back surface of the device mounting substrate 140 and part of the front surface of the spacer 170 is adopted in the present disclosure, thereby preventing the ground from becoming unstable and suppressing generation of effects to transmission characteristics in the high-frequency range even in the structure in which part of the device mounting substrate 140 does not directly contact the pedestal 124 to be the ground potential.

A structure may be adopted in which a thin-film resistor is deposited onto the device mounting substrate 140 so as to be terminated at 25 to 75Ω by a series resistance of the optical device 160 in the present embodiment.

In the example shown in FIG. 2, the structure in which the pedestal 124 has a level difference as shown by the region where the device mounting substrate 140 is placed (fourth surface 127) and the region where the relay substrate 150 is placed (third surface 125) is shown, however, a structure in which there is no level difference between the both regions may be adopted. Sufficient characteristics can be obtained as far as the characteristic impedance of the glass coaxial part is matched to 50Ω±10Ω.

In the present embodiment, the first lead terminal 110 transmitting the modulated electrical signal includes a small-diameter part 114 and a large-diameter part 115 provided at an end of the small-diameter part 114 and having a larger diameter than that of the small-diameter part 114 as shown in FIG. 2. At least part of the large-diameter part 115 is exposed from the first surface 121 on the first surface 121 side. Then, the large-diameter part 115 and the first conductive pattern 152 placed on the relay substrate 150 are connected by brazing and soldering. For example, the large-diameter part 115 of the first lead terminal 110 and the relay substrate 150 are connected by a solder 70 made of a gold-tin alloy.

According to the above structure, further impedance matching can be realized in the optical module 1 in which the first lead terminal 110 and the relay substrate 150 are connected by brazing and soldering.

That is, when the first lead terminal 110 and the relay substrate 150 are connected by brazing and soldering, transmission of the electrical signal between the first lead terminal 110 and the relay substrate 150 is performed linearly. On the other hand, the return current propagating in the ground conductor detours around the first through hole 123 and is transmitted to the relay substrate 150 via the pedestal 124 and further through the spacer 170, which incurs the increase of an inductance component and makes realization of impedance matching more difficult. However, the structure in which the first lead terminal 110 has the large-diameter part 115 at a first end 111 protruding from the first surface 121 is adopted as described above, which can increase a capacitive component between the large-diameter 115 and an inner peripheral surface of the first through hole 123. Accordingly, the inductance component can be alleviated by the capacitive component, and impedance matching can be performed.

In particular, it is necessary to increase the diameter of the first through hole 123 for matching the characteristic impedance of the glass coaxial part to the vicinity of 50Ω as described later, and the distance between the pedestal 124 and the first lead terminal 110 is increased, which incurs increase of the inductance component caused by increase of paths of the return current. Accordingly, the above-described impedance matching realized by increasing the capacitive component between the large-diameter part 115 and the first through hole 123 becomes necessary and have many merits.

More preferably, it is desirable to adopt a structure in which the first conductive pattern 152 placed on the relay substrate 150 has a wide part 154 at a portion where the first lead terminal 110 is connected to the large-diameter part 115 by brazing and soldering. According to the structure, a function as a stub is also given to the wide part 154 and the capacitive component can be increased. As a result, further impedance matching can be realized.

There is a method for preventing parasitic inductance by providing a return path in a surface layer of the relay substrate as disclosed in JP 2014-107733 A and the like, however, the structure in which impedance matching is performed by increasing the capacitive component between the large-diameter part 115 and the first through hole 123 is adopted in the present disclosure as described above, thereby mounting parts on the surface of the relay substrate 150 can be realized. That is, it is difficult to mount parts on the surface of the relay substrate 150 when the return path to be the ground conductor is provided on the surface layer of the relay substrate 150, however, it is not necessary to provide such ground conductor on the surface layer of the relay substrate 150 by adopting the above structure, and parts can be mounted on the surface of the relay substrate 150.

The optical device 160 may be any of a direct modulation laser, an electro-absorption modulator integrated laser and a combination of a laser and a Mach-Zehnder modulator. In the present embodiment, the electro-absorption modulator integrated laser (hereinafter referred to as an EML) is used as the optical device 160. Accordingly, a drive impedance is 50Ω. The modulated electrical signal is transmitted to the inside of the optical subassembly 100 by the first lead terminal 110.

In an optical module used for low-speed communication, it is not necessary that the characteristic impedance of the glass coaxial part is strictly matched to 50Ω, and may be matched to, for example, approximately 30Ω. For example, when a diameter of the lead terminal is 0.25 mm, a diameter of the dielectric 130 is 0.8 mm and glass with a relative dielectric constant of 6.7 is used as the dielectric 130, the glass coaxial part can be realized. This is because size reduction takes precedence as the signal can be transmitted with this characteristic impedance in the low-speed application. However, the TO-CAN type package with a wide band in which the characteristic impedance is matched to 50Ω is necessary in an optical module used for high-speed communication with a transmission rate of 40 Gbit/S or more. However, the relative dielectric constant of glass as the dielectric 130 holding the first lead terminal 110 is 4 to 7, and a physical space is required for matching the characteristic impedance of the glass coaxial part to 50Ω. For example, in order to provide a coaxial line in which the impedance is matched to 50Ω by the glass with the relative dielectric constant of 6.7, the first through hole 123 with a diameter of 2 mm or more is required. Accordingly, the size of the optical module 1 is naturally determined under the constraint. Sufficient characteristics can be obtained by matching the impedance to 50±10Ω.

A structure in which the diameter of the large-diameter part 115 of the first lead terminal 110 is 1.6 times or more to 2.4 times or less of the diameter of a second end 112 as the small-diameter part 114 is adopted in the present embodiment. As a specific example, the diameter of the first lead terminal 110 in the second end 112 is 0.25 mm, whereas the diameter of the large-diameter part 115 is 0.4 mm.

Figure 3:
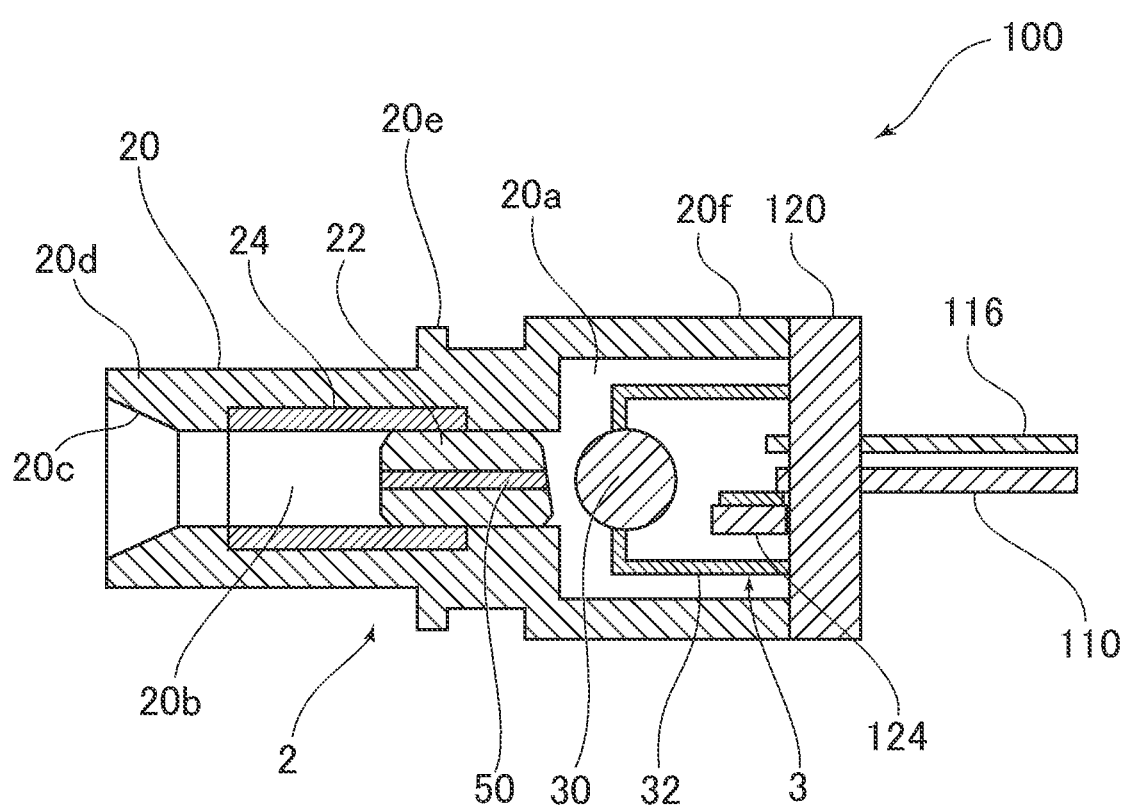
FIG. 3 is a schematic view showing a cross-sectional structure of the optical subassembly according to the first embodiment.

FIG. 3 is a schematic view showing a cross-sectional structure of the optical subassembly 100 according to the embodiment. As shown in FIG. 3, the optical subassembly 100 according to the embodiment includes the optical receptacle 2 and an optical package 3. The optical receptacle 2 includes an optical receptacle body 20, a stub 22 and a sleeve 24.

The optical receptacle body 20 according to the embodiment is configured by having a resin member that is integrally formed, including an optical package housing part 20f having a columnar outer shape and an optical fiber insertion part 20d having an approximately columnar shape with a smaller outer diameter than an outer diameter of the optical package housing part 20f. Respective one end surfaces of the optical package housing part 20f and the optical fiber insertion part 20d are connected to each other.

A circular concave part 20a is formed coaxially with the outer shape of the optical package housing part 20f, which has a cylindrical shape.

A through hole 20b extending coaxially with the outer shape of the optical fiber insertion part 20d from a tip end surface of the optical insertion part 20d to reach a bottom surface of the concave part 20a formed in the optical package housing part 20f is formed in the optical receptacle body 20. That is, the concave part 20a and the through hole 20b penetrating from the concave part 20a to the outside are formed in the optical receptacle body 20.

A tapered part 20c formed at a tip end of an inner wall surface of the through hole 20b has a tapered shape a diameter of which is increased toward the outer side. Accordingly, a connecter having an optical fiber 50 is easily inserted.

A flange 20e is formed along an outer periphery of the optical fiber insertion part 20d.

The stub 22 is formed by containing zirconia. The stub 22 has an approximately columnar shape with almost the same size as that of the through hole 20b formed in the optical fiber insertion part 20d of the optical receptacle body 20, and holds the optical fiber 50 that is coaxial with the stub 22. Then, the stub 22 is inserted into and fixed in the optical fiber insertion part 20d of the optical receptacle body 20 by press fitting or the like. A right-side end surface of the stub 22 is obliquely polished. Accordingly, interference between light inputted from the optical fiber 50 and reflected light thereof is prevented.

A left-side side surface of the stub 22 of the optical receptacle 2 abuts on the connector (not shown) including the optical fiber 50 inserted into the through hole 20b from the outside to thereby connect the optical fiber 50 included in the connector and the optical fiber 50 held by the stub 22.

The sleeve 24 is configured by containing zirconia having elasticity. Then, the sleeve 24 has a cylindrical shape with almost the same diameter as that of the through hole 20b, which is embedded in a groove provided on the inner wall surface of the optical receptacle body 20. The position adjustment of the optical fiber 50 inserted into the optical fiber insertion part 20d inside the through hole 20b can be performed by the sleeve 24.

The optical package 3 includes a sphere lens 30. The optical package 3 also includes a lens supporting part 32 as a bottomed cylindrical member made of metal in which an opening with approximately the same diameter as the lens 30 is formed on a bottom surface. The opening of the lens supporting part 32 is formed coaxially with the shape of the bottom surface of the lens supporting part 32. Then, the lens 30 is fitted to the opening of the lens supporting part 32. That is, the lens supporting part 32 supports the lens 30.

The optical package 3 has the stem including the above-described eyelet 120 and the pedestal 124.

The subassembly 100 is assembled by bonding and fixing a joint surface between the concave part 20a of the optical receptacle 2 and the first surface 121 of the eyelet 120. At this time, the lens supporting part 32 welded to the eyelet 120 and the lens 30 fitted to the lens supporting part 32 are formed so as to enter the inside of the concave part 20a of the optical receptacle 2. That is, the lens 30 and the lens supporting part 32 are housed in the concave part 20a of the optical receptacle body 20. The method of welding the optical receptacle 2 and the optical package 3 is not limited to this.

FIG. 4 is a schematic plan view of the optical subassembly 100 according to the first embodiment shown in FIG. 2. The lens supporting part 32 is welded to the first surface 121 of the eyelet 120 as shown in FIG. 3, and a position of an inner periphery 32a of the lens supporting part 32 is shown by a long-dashed and short-dashed line in FIG. 4. The eyelet 120 with a diameter of 5.6 mm is used in the embodiment, and an example in which the inner periphery 32a has a circular shape with a diameter of 3.2 mm in the lens supporting part 32 to be combined with the eyelet 120 will be explained.

In the embodiment, the diameter of the first through hole 123 is set to 1.5 times or more of the diameter of the second through hole 126 into which a second lead terminal 116 for transmitting a direct current signal is inserted for matching characteristic impedance of the glass coaxial part to 50Ω. On the other hand, when the diameter of the first through hole 123 is too large, the degree of freedom in design inside the eyelet 120 is reduced. Therefore, the diameter of the first through hole 123 is set to three times or less of the diameter of the second through hole 126. As a specific example of the glass coaxial part, a low-dielectric glass with a relative dielectric constant of approximately 4 to 5 is used as the dielectric 130, and the diameter of the first through hole 123 is set to 1.5 mm. Also in a case where glass made of a low-dielectric material with a relative dielectric constant smaller than 4 is used as the dielectric 130, the diameter of the first through hole 123 is required to be approximately 1.2 mm for matching the characteristic impedance of the glass coaxial part to 50Ω. In this case, an area of the first through hole 123 arranged on the inner periphery 32a side of the lens supporting part 32 seen from the extending direction of the first through hole 123 as shown in FIG. 4 becomes 14% or more of an area on the inner peripheral side of the lens supporting part 32 when the above-described lens supporting part 32 having the inner periphery 32a with the diameter of approximately 3.2 mm is used. In a case where glass with a relative dielectric constant of approximately 7 is used, the diameter of the first through hole 123 is required to be 2 mm or more for matching the characteristic impedance of the glass coaxial part to 50Ω. In this case, the area of the first through hole 123 arranged on the inner periphery 32a side of the lens supporting part 32 seen from the extending direction of the first through hole 123 occupies 40% of the area on the inner peripheral side of the lens supporting part 32 when the above-described lens supporting part 32 having the inner periphery 32a with the diameter of approximately 3.2 mm is used.

Accordingly, in the eyelet 120 according to the embodiment, the area of the first through hole 123 arranged on the inner peripheral side of the lens supporting part 32 seen from the extending direction of the first through hole 123 is set to 14% or more to 40% or less of the area defined by the diameter of the lens supporting part 32 to be combined, namely, the area on the inner peripheral side of the lens supporting part 32.

When the structure in which the first lead terminal 110 has the large-diameter part 115 is adopted, not only the above-described merits on the characteristics but also merits on manufacturing can be obtained. That is, it is preferable to reduce the area of the relay substrate 150 for reducing costs. However, in a case where mounting variation occurs, the solder 70 made of a gold-tin alloy or the like is not attached between the first lead terminal 110 and the first conductor pattern 152 when the first lead terminal 110 and the first conductor pattern 152 formed in the relay substrate 150 is separated, which deteriorates a manufacturing yield. In response to the problem, the structure in which the first end 111 of the first lead terminal 110 is the large-diameter part 115 is adopted, the first end 111 of the first lead terminal 110 and the first conductor pattern 152 of the relay substrate 150 can be connected by the solder 70 even when the position of the relay substrate 150 is shifted to some degree. As a result, the size of the relay substrate 150 can be reduced, which can contribute to reduction in cost.

Figure 5B:
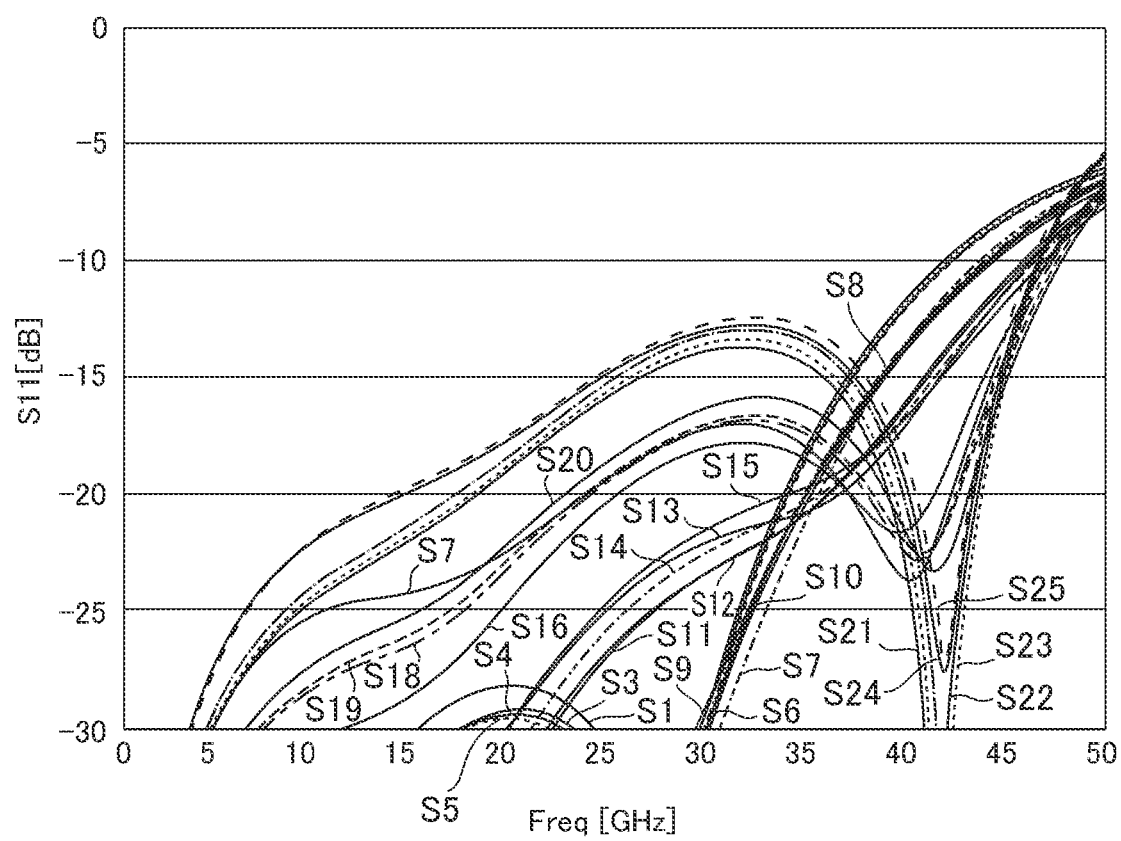
FIG. 5B is a graph obtained by calculating the relation of a protruding amount of a lead terminal and a diameter of a large-diameter part with respect to reflection characteristics by the high-frequency three dimensional electromagnetic field simulator HFSS (High Frequency Structure Simulator) according to the first embodiment.

Next, results obtained by calculating reflection characteristics when the diameter of the large-diameter part 115 and an protruding amount of the first lead terminal 110 from the first surface 121 are changed in the case of using the first lead terminal 110 with the diameter of 0.25 mm by using the high-frequency three dimensional electromagnetic field simulator HFSS (High Frequency Structure Simulator) are shown in FIG. 5A and FIG. 5B. FIG. 5A is a table of data used for the simulator and FIG. 5B is a graph showing calculation results by the high-frequency three dimensional electromagnetic field simulator HFSS corresponding to simulation numbers (S1 to S25) written in FIG. 5A. The protruding amount of the first lead terminal 110 from the first surface 121 means the distance between the end surface of the large-diameter part 115 and the first surface 121 in the extending direction of the first through hole 123. In FIG. 5B, the horizontal axis represents the frequency of the electrical signal to be transmitted and the vertical axis represents the signal level obtained when the electrical signal transmitted from the second end 112 side of the first lead terminal 110 is transmitted to the first end 111 and is returned to the second end 112. Accordingly, it is desirable that S11 [dB] as a value in the vertical axis is a small value.

As shown in FIG. 5B, behaviors particularly in the diameter of the large-diameter part 115 and the protruding amount (pin height) of the first lead terminal 110 differ in a 30 GHz band and a 40 GHz band. The diameter of the large-diameter part 114 is preferably 0.55 mm or more particularly in the 40 GHz band, whereas approximately 0.35 mm is optimum in the 30 GHz band.

Figure 6:
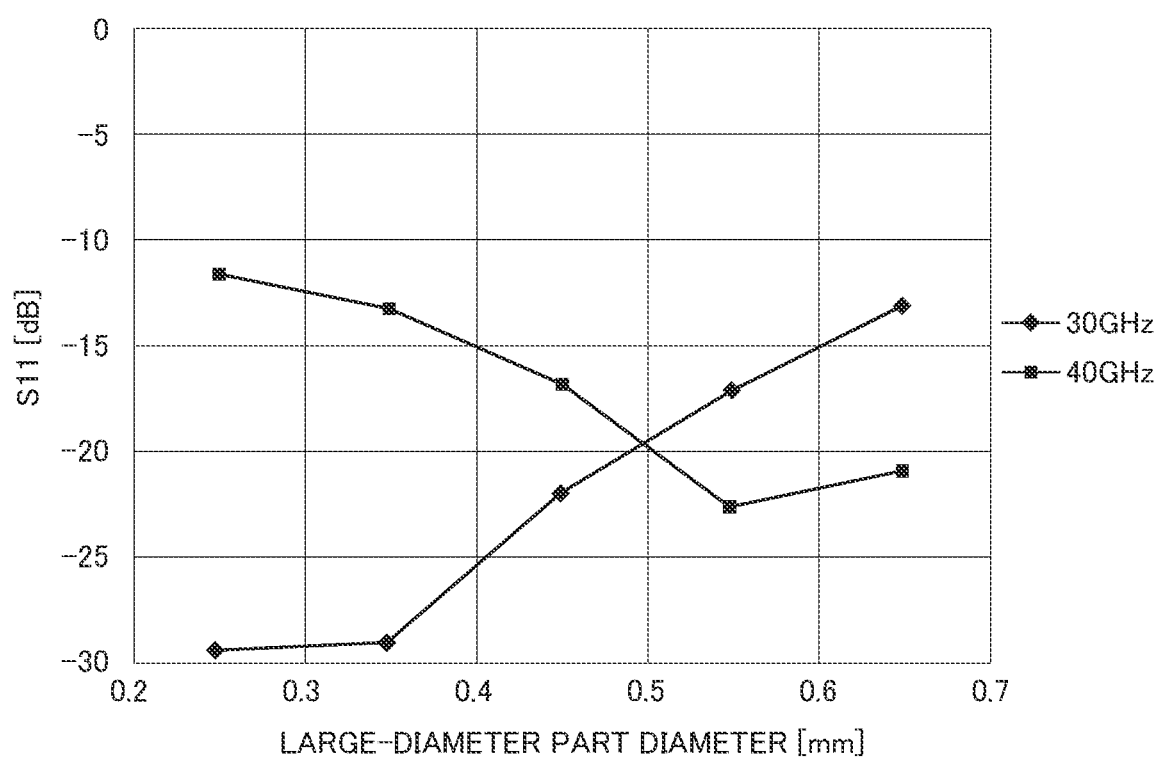
FIG. 6 is a chart obtained by comparing behaviors in 30 GHz and behaviors in 40 GHz with respect to the relation between the diameter of the large-diameter part and reflection characteristics.

FIG. 6 is a chart obtained by comparing behaviors in 30 GHz and behaviors in 40 GHz with respect to the relation between the diameter of the large-diameter part 115 and reflection characteristics. In the simulation, the protruding amount (pin height) of the first lead terminal 110 is 0.1 mm and the diameter of the small-diameter part 114 is 0.25 mm.

It is preferable that S11 is −15 dB or less in a wide frequency range for realizing a wide-band transmission path. As shown in FIG. 6, in the case where the first lead terminal 110 in which the diameter of the small-diameter part 114 is 0.25 mm is used, S11 can be −15 dB or less when the diameter of the large-diameter part 115 is 0.4 mm to 0.6 mm in both cases where the frequencies of the electrical signals to be transmitted are 30 GHz and 40 GHz. Accordingly, it is desirable that the diameter of the large-diameter part 115 of the first lead terminal 110 according to the embodiment is set to 1.6 times to 2.4 times of the diameter of the small-diameter part 114 such as the second end 112.

Figure 7:
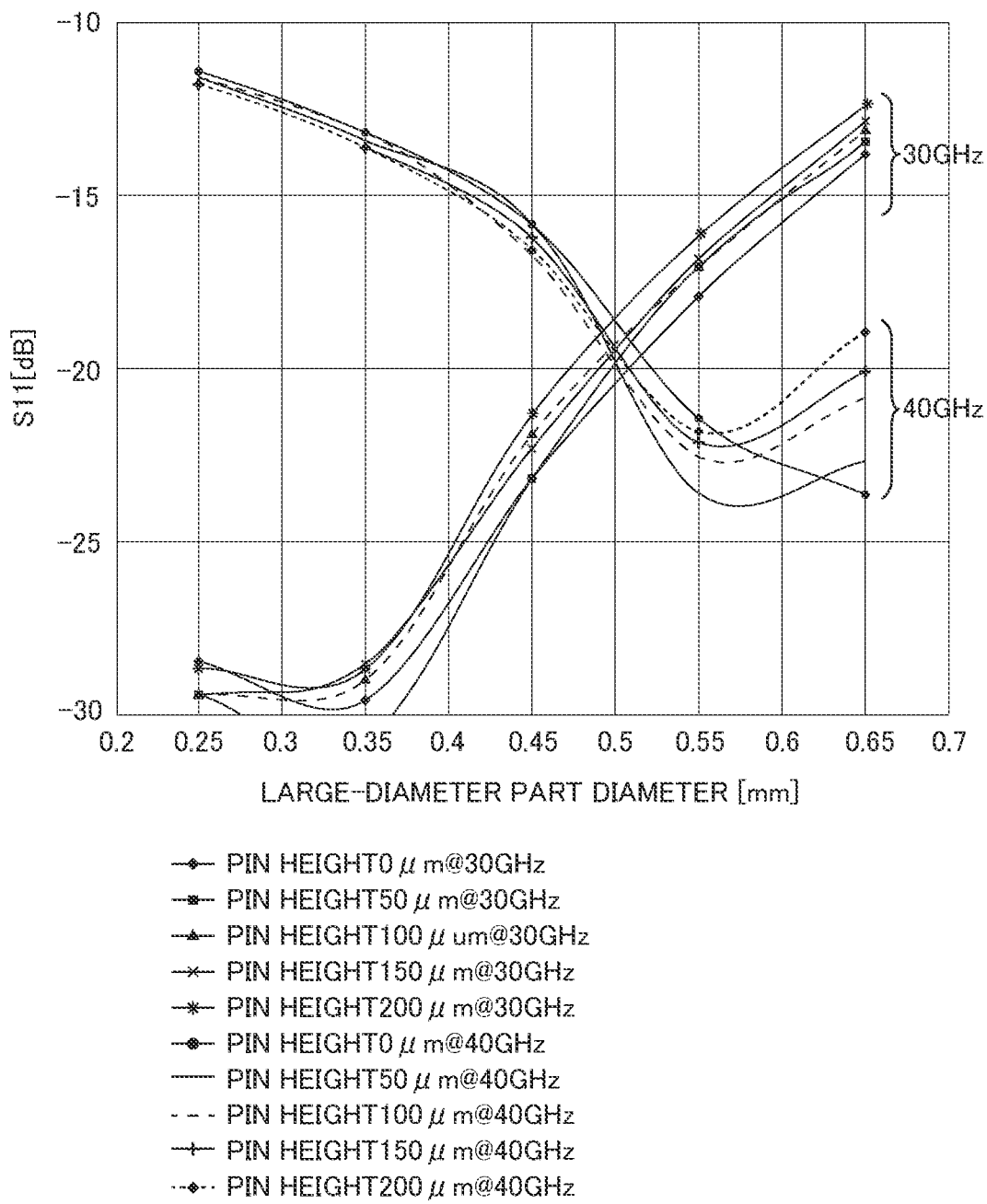
FIG. 7 is a chart graphically showing the relation of characteristics of S11 in 30 GHz and 40 GHz in respective diameters of the large-diameter part according to the protruding amount of the first lead terminal from the first surface according to the first embodiment.

FIG. 7 is a chart graphically showing the relation of characteristics of S11 in the 30 GHz and 40 GHz in respective diameters of the large-diameter part according to the protruding amount (pin height) of the first lead terminal 110 from the first surface 121. In FIG. 7, the protruding amount (pin heights) of the first lead terminal 110 are shown in a range equal to or less than 0.2 mm. The reason that the range is selected is as follows. First, the distance between the outer peripheral surface of the large-diameter part 115 and the inner peripheral surface of the first through hole 123 is separated when the protruding amount (pin height) of the first lead terminal 110 is set to be larger than 0.2 mm, therefore, the capacitive component between the outer peripheral surface of the large-diameter part 115 and the inner peripheral surface of the first through hole 123 is reduced. Moreover, air, not the dielectric 123, is interposed between the outer peripheral surface of the large-diameter part 115 and the inner peripheral surface of the first through hole 123. Therefore, a relative dielectric constant between the outer peripheral surface of the large-diameter part 115 and the inner peripheral surface of the first through hole 123 is reduced. Accordingly, the above-described capacitive component is reduced. Furthermore, the relative dielectric constant around the large-diameter part 115 is reduced, the inductance component is increased. Accordingly, it is difficult to alleviate the inductance component by the capacitive component, which makes matching of the characteristic impedance difficult. Therefore, the protruding amount (pin height) of the first lead terminal 110 is in the range equal to or less than 0.2 mm in the present embodiment.

As shown in FIG. 7, when the protruding amount (pin height) of the first lead terminal 110 is changed in a range of 0 to 0.2 mm, it is found that the smaller the protruding amount (pin height) of the first lead terminal 110 is, the smaller S11 becomes. However, even when the protruding amount (pin height) of the first lead terminal 110 is changed in the range of 0 to 0.2 mm, variations of the S11 in respective frequencies (30 GHz, 40 GHz) are so small, and it is found that the ideal diameter of the large-diameter part 115 is approximately 0.5 mm in any status. Therefore, the protruding amount (pin height) of the first lead terminal 110 in the optical module 1 according to the embodiment is preferably 0 to 0.2 mm.

Figure 8:
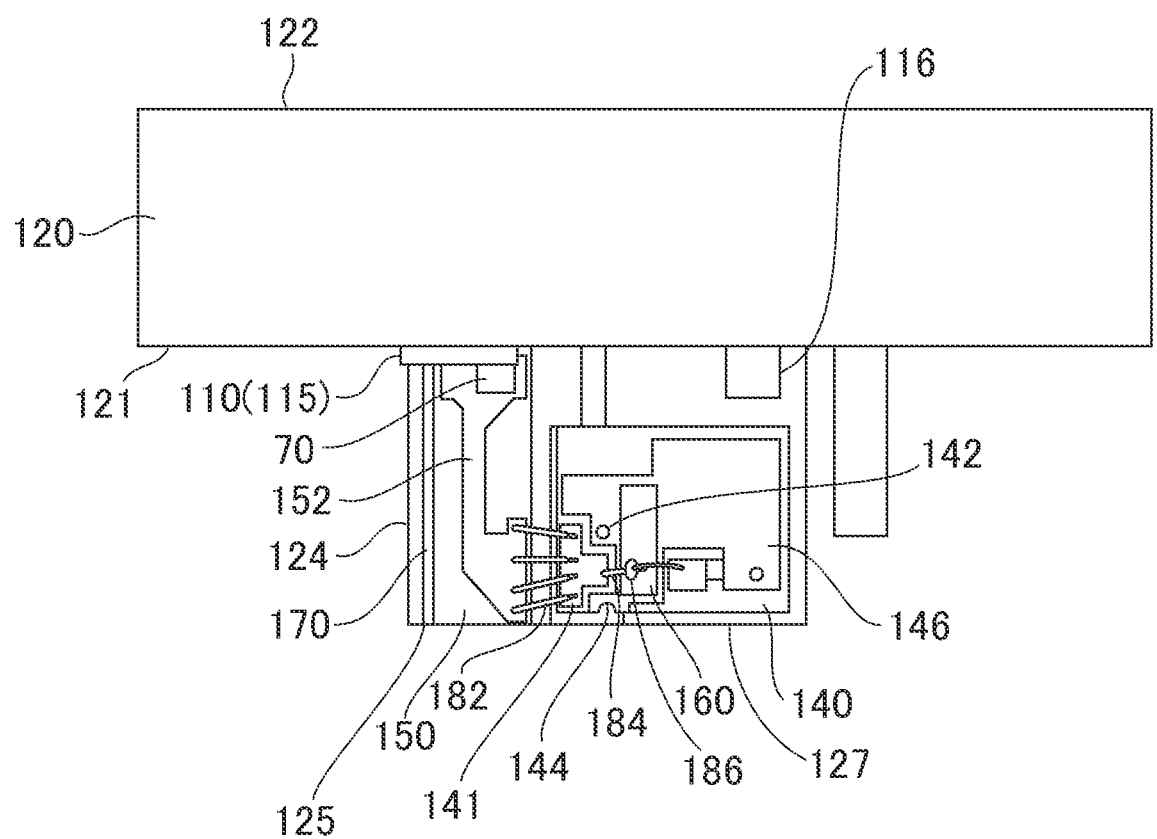
FIG. 8 is a schematic top view of the optical module according to the first embodiment.

FIG. 8 is a schematic top view of the optical module 1 according to the embodiment. In the embodiment, a via 142 and a castellation 144 to be pillars of the ground potential are arranged on both sides of the high-frequency line. The via 142 is formed by filling the inside of the through hole with the conductor, which electrically connects front and back surfaces (the mounting surface on which the optical device 160 is mounted and the back surface thereof) of the device mounting substrate 140. The castellation 144 has a concave-shaped notch portion provided from the front surface to the back surface of the device mounting substrate 140, and a metal film is formed on an inner peripheral surface of the concave shape. The castellation 144 electrically connect the front and back surfaces (the mounting surface on which the optical device 160 is mounted and the back surface thereof) of the device mounting substrate 140. The ground pattern 146 provided on the surface (mounting surface) side of the device mounting substrate 140 is electrically connected to the ground layer on the back surface of the device mounting substrate 140 through the via 142, the castellation 144 and so on. The position of the via 142 is not particularly limited merely for conduction between the front and back surfaces, however, the position and the number of vias 142 become important from a viewpoint of high frequency. In the case of the embodiment, the high-frequency signal is transmitted from the relay substrate 150 to the device mounting substrate 140 by a plurality of first wires 182. After that, the signal passes through the second conductor pattern 141 on the device mounting substrate 140 and transmitted to the modulation device 186 through the second wire 184. As the modulation device 186 according to the embodiment, for example, the electro-absorption modulator can be used. In the transmission section of the high-frequency electrical signal, it is advantageous that there is the ground potential around the high-frequency electrical signal for confining the electromagnetic field of the high-frequency signal. The ground pattern 146 on the front surface and the ground layer on the back surface of the device mounting substrate 140 are connected in the vicinity of the connection part between the relay substrate 150 and the device mounting substrate 140 by the via 142 and the castellation 144. As the region connecting the ground pattern 146 on the front surface (mounting surface) of the device mounting substrate 140 and the ground layer on the back surface of the device mounting substrate 140 exists, deterioration in high-frequency characteristics can be further reduced.

Also in the embodiment, the device mounting substrate 140 and the relay substrate 150 are connected by plural first wires 182. According to the structure, it is possible to suppress the increase of the inductance component and to realize impedance matching in the high-frequency range.

On the other hand, transmission of the electrical signal from the device mounting substrate 140 to the optical device 160 is connected by one second wire 184. This is because it is necessary to reduce an electrode size of the optical device 160 for suppressing the increase of parasitic capacitance in the optical device 160. Accordingly, in order to suppress generation of the inductance component in the second wire 184, the strong ground pattern 146 is provided on right and left of the second wire 184 in the device mounting substrate 140 to configure a grounded coplanar line. Then, the castellation 144 is provided on a light-emitting point side of the optical device 160 and the via 142 is provided on the rear side for making the ground strong so that the pedestal 124 to be the strong ground and the ground pattern 146 are connected in the shortest distance. The ground pattern 146 of the device mounting substrate 140 is connected to the ground potential of the pedestal 124 through a first connection part (for example, the via 142) and a second connection part (for example, the castellation 144), and a segment connecting between the first connection part and the second connection part seen from the direction orthogonal to the mounting surface on which the optical device 160 is mounted crosses the second wire 184 connecting between the second conductor pattern 141 and the optical device 160. According to the structure, it is possible to reduce the increase of the inductance component and to realize impedance matching in the high-frequency range even when the connection between the optical device 160 and the device mounting substrate 140 is, for example, the connection by one second wire 184.

In the present specification, a wording "eyelet" that indicates a metal disc is used, however, the fact that the eyelet 120 has the disc shape has no essential meaning, and other shapes such as a polygonal prism can be adopted.

The optical subassembly 100 may also have a bias to the laser diode as the optical device 160, a bias to the photodiode that monitors a rear output and a thermistor terminal for monitoring a laser temperature.

While there have been described what are at present considered to be certain embodiments, it will be understood that various modifications may be made thereto, and it is intended that the appended claims cover all such modifications as fall within the true spirit and scope of the invention.

What is claimed is:

1. An optical subassembly comprising:
   an eyelet including a first surface and a second surface arranged opposite the first surface,
      a first through hole penetrating from the first surface to the second surface;
   a first lead terminal inserted into the first through hole and transmitting an electrical signal;
   a dielectric filled in the first through hole;
   a device mounting substrate on which an optical device converting at least one of an optical signal and the electrical signal into another is mounted;
   a relay substrate including a first conductor pattern transmitting the electrical signal to the optical device;
   a pedestal protruding from the first surface to an extending direction of the first through hole and including a third surface on which the relay substrate is placed and a fourth surface on which the device mounting substrate is placed; and
   a spacer interposed between the third surface and the relay substrate to electrically connect a back surface of the relay substrate and the pedestal.

2. The optical subassembly according to claim 1, wherein the third surface is arranged at a position farther from a center of the eyelet than the fourth surface and a front surface of the spacer is arranged at a position farther from the center of the eyelet than a back surface of the device mounting substrate in a direction orthogonal to the third surface.

3. The optical subassembly according to claim 2, wherein a level difference between the third surface and the fourth surface in the direction orthogonal to the third surface is larger than a thickness of the spacer.

4. The optical subassembly according to claim 2, wherein:
   part of the front surface of the spacer does not overlap with the relay substrate and is exposed when seen from the direction orthogonal to the third surface,
   part of the back surface of the device mounting substrate protruding from a fourth surface side to a third surface side so as to face part of the front surface of the spacer when seen from a direction orthogonal to the fourth surface, and
   a ground conductor directly connecting part of the back surface of the device mounting substrate and part of the front surface of the spacer is interposed between part of the back surface of the device mounting substrate and part of the front surface of the spacer.

5. The optical subassembly according to claim 4, wherein the ground conductor is arranged so as to overlap with part of the front surface of the spacer and part of the back surface of the device mounting substrate when seen from the direction orthogonal to the third surface.

6. The optical subassembly according to claim 1, further comprising:
   a lens supporting part welded to the first surface; and
   a lens fixed to an opening of the lens supporting part,
      wherein an area of the first through hole arranged on an inner peripheral side of the lens supporting part seen from the extending direction of the first through hole is 14% or more to 40% or less of an area of the inner peripheral side of the lens supporting part.

7. The optical subassembly according to claim 1, wherein the device mounting substrate includes a thin-film resistor of 50±25Ω.

8. The optical subassembly according to claim 1, further comprising:
   a second through hole penetrating from the first surface to the second surface; and
   a second lead terminal inserted into the second through hole and transmitting a direct current signal,
      wherein a diameter of the first through hole is 1.5 times or more and 3 times or less of a diameter of the second through hole.

9. The optical subassembly according to claim 1, wherein the device mounting substrate further includes:
   a second conductor pattern provided on a mounting surface side of the optical device and transmitting the electrical signal to the optical device,
   a first connection part and a second connection part electrically connecting the mounting surface side to a back surface of the device mounting substrate, and connected to a ground potential of the pedestal, and
   a ground pattern mounted on the mounting surface side and connected to the ground potential of the pedestal through the first connection part and the second connection part,
      wherein the second conductor pattern and the optical device are connected by a second wire, and
      wherein the second conductor pattern, the first connection part, the second connection part and the ground pattern configure a grounded coplanar line.

10. An optical module comprising:
    the optical subassembly according to claim 1;

a printed circuit board; and a flexible printed circuit board electrically connected to the printed circuit board and the optical subassembly.

11. An optical subassembly comprising:

an eyelet including a first surface and a second surface arranged opposite the first surface,
a first through hole penetrating from the first surface to the second surface;

a first lead terminal inserted into the first through hole and transmitting an electrical signal;

a dielectric filled in the first through hole;

a device mounting substrate on which an optical device converting at least one of an optical signal and the electrical signal into another is mounted;

a relay substrate including a first conductor pattern transmitting the electrical signal to the optical device; and a pedestal protruding from the first surface to an extending direction of the first through hole, on which the relay substrate and the device mounting substrate are placed, wherein the device mounting substrate is arranged on a different level of the pedestal than the relay substrate, wherein the first lead terminal includes a small-diameter part and a large-diameter part provided at an end of the small-diameter part, wherein a diameter of the large-diameter part is larger than a diameter of the small-diameter part, wherein at least part of the large-diameter part is exposed from the dielectric on a first surface side, and wherein the first lead terminal and the first conductor pattern are connected by brazing and soldering.

12. The optical subassembly according to claim 11, wherein the first conductor pattern has a wide part to be connected to the large-diameter part by brazing and soldering.

13. The optical subassembly according to claim 11, wherein the diameter of the large-diameter part is 1.6 times or more to 2.4 times or less of the diameter of the small-diameter part.

14. The optical subassembly according to claim 11, wherein a distance between an end surface of the large-diameter part and the first surface in the extending direction of the first through hole is 0 mm or more to 0.2 mm or less.

15. The optical subassembly according to claim 11, further comprising:

a lens supporting part welded to the first surface; and a lens fixed to an opening of the lens supporting part, wherein an area of the first through hole arranged on an inner peripheral side of the lens supporting part seen from the extending direction of the first through hole is 14% or more to 40% or less of an area of the inner peripheral side of the lens supporting part.

16. The optical subassembly according to claim 11, wherein a characteristic impedance of a coaxial line formed by the eyelet, the dielectric and the first lead terminal is $50\pm10\Omega$.

17. The optical subassembly according to claim 11, further comprising:

a second through hole penetrating from the first surface to the second surface; and a second lead terminal inserted into the second through hole and transmitting a direct current signal, wherein a diameter of the first through hole is 1.5 times or more and 3 times or less of a diameter of the second through hole.

18. The optical subassembly according to claim 11, wherein the device mounting substrate further includes:

a second conductor pattern provided on a mounting surface side of the optical device and transmitting the electrical signal to the optical device, a first connection part and a second connection part electrically connecting the mounting surface side to a back surface of the device mounting substrate, and connected to a ground potential of the pedestal, and a ground pattern mounted on the mounting surface side and connected to the ground potential of the pedestal through the first connection part and the second connection part, wherein the second conductor pattern and the optical device are connected by a second wire, and wherein the second conductor pattern, the first connection part, the second connection part and the ground pattern configure a grounded coplanar line.

19. The optical subassembly according to claim 11, further comprising:

a ground conductor overlapping with the dielectric when seen from the extending direction of the first lead terminal.

20. An optical module comprising:

the optical subassembly according to claim 11;

a printed circuit board; and a flexible printed circuit board electrically connected to the printed circuit board and the optical subassembly.

* * * * *